Figures 1, 2:
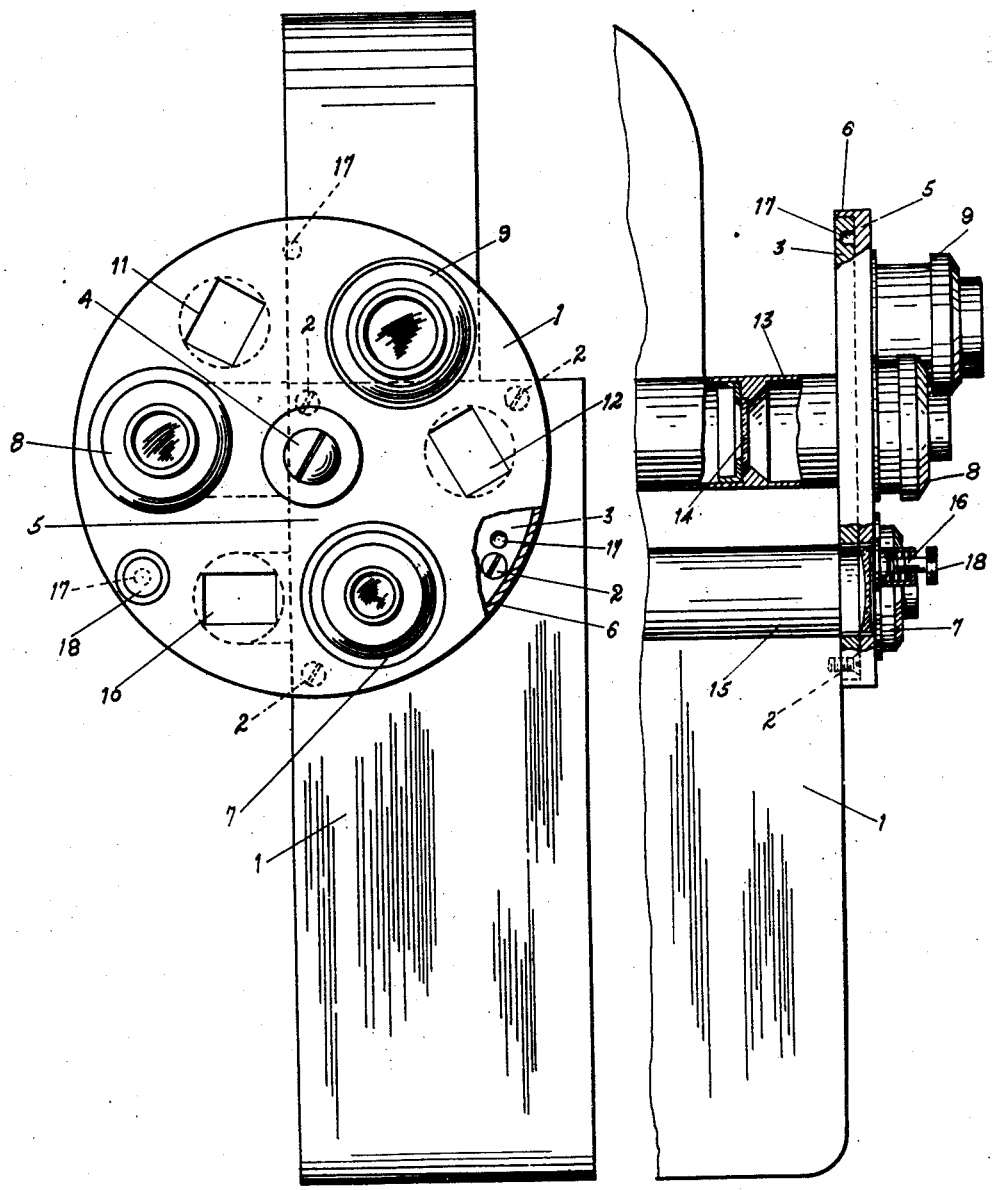

Oct. 25, 1932.   F. H. OWENS   1,884,169

PHOTOGRAPHIC CAMERA

Filed July 31, 1929

INVENTOR.
FREEMAN H. OWENS.
BY
*Philip S. Hopkins*
ATTORNEY.

Patented Oct. 25, 1932

1,884,169

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

PHOTOGRAPHIC CAMERA

Application filed July 31, 1929. Serial No. 382,565.

This invention relates to improvements in a lens turret for photographic cameras, the principal object of the invention being to provide in combination with cameras of either the ordinary "view" or of the "motion picture" variety, a lens turret or mount for a plurality of lenses of different focal lengths by means of which the particular lens desired for taking any given picture or motion picture may be brought into operative position.

Other objects and advantages of the invention will appear as the description proceeds.

In the drawing accompanying this specification,

Figure 1 is a front elevation of a portion of a camera having the improved lens turret mounted thereon; and Figure 2 is a partly sectional side view showing the turret-supporting portion of the camera broken away.

The same characters of reference designate the same parts in both figures of the drawing.

Referring to the drawing, 1 designates a portion of the front wall of a camera, on which is secured by means of screws 2 a stationary disk 3. Mounted for rotation on a pintle 4 disposed centrally of the disk 3, is a second disk or turret 5, having a flange 6 encircling the disk 3, whereby light is prevented from entering between the disks and providing a bearing for the rotatable disk.

Suitably mounted in the turret disk 5 are a plurality of lenses of different focal lengths, three such lenses 7, 8 and 9, respectively, being shown herein, each of said lenses being adapted to be independently focused by rotation of its supporting barrel or mount in the common and well known manner. At suitable points adjacent to the respective lenses 7, 8 and 9, corresponding finder lenses 10, 11 and 12 are mounted in the turret disk 5. The camera is provided with a focusing tube 13 having the usual ground glass 14 upon which the object to be photographed is visible and with a tube 15, both of said tubes communicating with openings in the stationary disk 2. The disposition of the lenses 7, 8 and 9 and their cooperating finder lenses 10, 11 and 12 on the turret is such that when either of the lenses is at the exposure position, that is, in alignment with the film and finder cooperating with that particular lens is in alignment with the tube 15. For maintaining the disk 5 in this position a spring-pressed detent pin 16 is mounted in the disk 5, and the disk 3 has formed therein a plurality of depressions or holes 17, corresponding in number with the lenses, the location of said holes relative to the detent pin being such that whenever the pin is in axial alignment with one of said holes one of the lenses is at the exposure position and its cooperating finder in alignment with the tube 15. The spring is so associated with the pin that the latter under the tension of the spring will be maintained in frictional contact with disk 3 so that when the pin arrives at one of the holes it will automatically drop into said hole. When it is desired to rotate the disk 5 to bring another lens into position, the detent 16 may be manually withdrawn against the tension of its spring by taking hold of the head 18 and pulling it outwardly so as to permit the disk 5 to be rotated.

In the operation of the device, the turret is rotated first to bring the selected lens into alignment with the focusing tube 13, whereupon the object or view to be photographed may be observed on the ground glass 14. The mount of the selected lens is then manipulated until the correct focus is obtained, whereupon the turret is rotated to carry the selected and focused lens into picture taking position, that is, in alignment with the film or plate in the camera, in which position the turret is maintained by engagement of the detent 16 with one of the openings 17 in the disk 3. The cooperating finder lens of the focused lens will then be in register with the tube 15, so that the operator may view the image of the object to be photographed.

I claim:

1. The combination with a camera having a focusing tube and a finder tube, of a turret mounted for rotation on said camera, a plurality of lenses of different focal lengths and a separate cooperating finder lens for each of said lenses mounted in said turret, said lenses being adapted upon rotation of the turret to be selectively brought into alignment with said focusing tube and then into picture-taking position, the relative disposition of the lenses and cooperating finder lenses being such that when a selected lens is in picture taking position its cooperating finder lens will be in alignment with the finder tube, and means for retaining the turret stationary while the selected lens and its finder are in the picture-taking position.

2. The combination with a camera having a focusing tube, an exposure station and a finder tube, a stationary disk secured to said camera and having openings in alignment with said tubes and station respectively, a disk mounted for rotation on said first disk in concentric relation thereto, a plurality of lenses of different focal lengths and a cooperating finder lens for each of said lenses mounted in said rotatable disk, said lenses being adapted upon rotation of the disk to be selectively carried into alignment first with said focusing tube and then with said exposure station, the relative disposition of the lenses and cooperating finder lenses being such that when a selected lens is in alignment with the exposure station its cooperating finder lens will be in alignment with said finder tube, and means carried by the rotatable disk for frictional engagement with the stationary disk for retaining the selected lens and its cooperating finder lens in the last mentioned position.

3. In combination with a camera having a focusing tube, a finder tube and an exposure station, a turret mounted for rotation on said camera, a plurality of lenses of different focal lengths on said turret, separate finder lenses on said turret for each of said lenses, said lenses being so arranged that by rotation of said turret any selected lens may be brought into alignment with said focusing tube, means for focusing the selected lens in such position, said focused lens then being movable by rotation of said turret into alignment with said exposure station in which position the corresponding finder lens is in alignment with said finder tube and in which position another of said lenses is in alignment with said focusing tube.

In testimony whereof, I affix my signature.

FREEMAN H. OWENS.